(12) United States Patent
Baker et al.

(10) Patent No.: US 7,526,247 B2
(45) Date of Patent: Apr. 28, 2009

(54) SYSTEM AND METHOD FOR SETTING THE REVERSE LINK GAIN OF REPEATERS IN WIRELESS COMMUNICATIONS SYSTEMS

(75) Inventors: Kenneth Robert Baker, Boulder, CO (US); Charles E. Wheatley, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1009 days.

(21) Appl. No.: 10/729,338

(22) Filed: Dec. 4, 2003

(65) Prior Publication Data

US 2004/0219876 A1 Nov. 4, 2004

Related U.S. Application Data

(60) Provisional application No. 60/431,644, filed on Dec. 5, 2002, provisional application No. 60/449,808, filed on Feb. 24, 2003.

(51) Int. Cl.
    *H04B 7/15* (2006.01)
(52) U.S. Cl. ............... 455/11.1; 455/13.4; 455/69; 455/127.2
(58) Field of Classification Search ............ 455/7, 455/11.1, 522, 10, 9, 69, 442, 13.4, 15, 223.1, 455/127.2, 67.11, 20, 21, 126, 232.1, 24, 455/67.13; 370/332, 318, 320, 218
See application file for complete search history.

(56) References Cited

U.S. PATENT DOCUMENTS

| | | | |
|---|---|---|---|
| 5,056,109 A | 10/1991 | Gilhousen et al. | |
| 5,383,219 A | 1/1995 | Wheatley, III et al. | |
| 5,396,516 A | 3/1995 | Padovani et al. | |
| 6,147,981 A * | 11/2000 | Prescott | 370/318 |
| 6,515,975 B1 * | 2/2003 | Chheda et al. | 370/332 |
| 6,615,021 B1 * | 9/2003 | Lovinggood et al. | 455/11.1 |
| 7,058,400 B2 * | 6/2006 | Brooks | 455/424 |
| 2001/0046878 A1 * | 11/2001 | Chang | 455/522 |
| 2003/0123401 A1 * | 7/2003 | Dean | 370/318 |
| 2003/0220075 A1 | 11/2003 | Baker et al. | |
| 2004/0001464 A1 | 1/2004 | Adkins et al. | |
| 2004/0176026 A1 * | 9/2004 | Gainey et al. | 455/11.1 |

OTHER PUBLICATIONS

International Search Report—PCT/US03/038803, International Search Authority—USPTO—Apr. 9, 2004.

* cited by examiner

*Primary Examiner*—John J Lee
(74) *Attorney, Agent, or Firm*—Jae-Hee Choi; Linda G. Gunderson

(57) ABSTRACT

A method and apparatus are disclosed for setting total reverse link gain between a repeater and a base station. The method and apparatus generally comprise setting total reverse link gain between a repeater and a base station comprises determining an operating point for the repeater; establishing a reverse communication link between the base station and a transceiver device within a coverage area of the repeater; determining if an increase in a reverse link gain is substantially equal to an increase in a noise figure of the base station, using a transmit power of the transceiver device; and adjusting the reverse link gain by an amount based on the operating point and based on a difference in reverse link gain values, if the increase in the reverse link gain is substantially equal to the increase in the noise figure of the base station, to set the total reverse link gain.

29 Claims, 8 Drawing Sheets

SYSTEM AND METHOD FOR SETTING THE REVERSE LINK GAIN OF REPEATERS IN WIRELESS COMMUNICATIONS SYSTEMS

CROSS-REFERENCE TO RELATED APPLICATION

This application claims the benefit of U.S. Provisional Patent Application Ser. No. 60/431,644, filed Dec. 5, 2002, and U.S. Provisional Application Ser. No. 60/449,808 filed Feb. 24, 2003, which are incorporated herein by reference in their entirety.

BACKGROUND

I. Field of Invention

The invention generally relates to wireless communication systems, and more particularly to setting the reverse link gain of a repeater.

II. Description of the Related Art

In wireless communication systems, mobile stations or user terminals receive signals from fixed position base stations (also referred to as cell cites or cells) that support communication links or service within particular geographic regions adjacent to or surrounding the base stations. In order to aid in providing coverage, each cell is often sub-divided into multiple sectors, each corresponding to a smaller service area or geographic region. A network of base stations provides wireless communication service to an expansive coverage area. Due to various geographic and economic constraints, the network of base stations does not provide adequate communication services in some areas within the desired coverage area. These "gaps" or "holes" in the coverage area may be filled with the use of repeaters.

Generally, a repeater is a high gain bi-directional amplifier. Repeaters receive, amplify and re-transmit signals to and from the communication device and a base station. The repeater may provide communication service to the coverage hole, which was previously not serviced by the base station. Repeaters may also augment the coverage area of a sector by shifting the location of the coverage area or altering the shape of the coverage area. Accordingly, repeaters can play an integral role in providing wireless communication.

However, a repeater is not a noiseless device and will contribute additional noise into a donor sector receiver. This noise may raise the noise floor of the base station, thereby shrinking the reverse link coverage of the base station sector. While the amount of signal and noise broadcast back to the donor sector can be manipulated by adjusting the repeater gain and the repeater to donor antenna gains, a tradeoff exists between whether the repeater or the sector coverage area is impacted. Namely, it is not possible to have minimum or nominal noise figure at both a repeater and base station. Thus, the operating point of the repeater is important to network operation. The primary parameter controlling the operating point for a repeater system is the total link gain between a repeater and base station. However, it is difficult and not practical to simply set the total link gain to a desired value. Accordingly, there is a need for a less complex and efficient way to set the total link gain to the desired value.

SUMMARY

Embodiments disclosed herein address the above stated needs by providing embodiments for setting total reverse link gain between a repeater and a base station. In one aspect, a method for setting total reverse link gain between a repeater and a base station comprises determining an operating point for the repeater; establishing a reverse communication link between the base station and a transceiver device within a coverage area of the repeater; determining if an increase in a reverse link gain is substantially equal to an increase in a noise figure of the base station, based on a transmit power of the transceiver device; and adjusting the reverse link gain by an amount based on the operating point and based on a difference in reverse link gain values, if the increase in the reverse link gain is substantially equal to the increase in the noise figure of the base station, to set the total reverse link gain.

Determining if the increase in the reverse link gain is substantially equal to the increase in the noise figure of the base station may comprise summing a reverse link gain value and corresponding transmit power value of the receiver device to obtain a first sum value; and increasing the reverse link gain value and re-summing the reverse link gain value and corresponding transmit power value to obtain a second sum value until a difference in the first and second sum values is obtained. Thereafter, adjusting the reverse link gain may comprise adjusting the reverse link gain by an amount based on the operating point and the difference in the first and second sum values. Alternatively, adjusting the reverse link gain may comprise adjusting the reverse link gain by an amount based on the operating point and a difference in two reverse link gain values.

Determining if the increase in the reverse link gain is substantially equal to the increase in the noise figure of the base station may also comprise monitoring the transmit power of the transceiver device; and determining when the transmit power becomes substantially constant with an increase in the reverse link gain or monitoring the transmit adjust value received by the transceiver device; and determining when the transmit adjust value becomes substantially constant with an increase in the reverse link gain. Thereafter, adjusting the reverse link gain may comprise adjusting the reverse link gain by an amount based on the operating point and a difference in two reverse link gain values. Alternatively, adjusting the reverse link gain may comprise summing a reverse link gain value and corresponding transmit power value of the receiver device to obtain a first sum value; increasing the reverse link gain value and re-summing the reverse link gain value and corresponding transmit power value to obtain a second sum value; and adjusting the reverse link gain by an amount based on the operating point and the difference in the first and second sum values.

In addition, establishing the reverse communication link may comprise initiating the reverse communication link from one of either the transceiver device or the base station. Establishing the reverse communication link may also comprise using a remote station circuitry within the coverage area to establish the reverse communication link. Moreover, establishing the reverse communication link may comprise embedding the transceiver device in the repeater. Determining the operating point may comprise determining an operating point based upon either one of link balancing or the amount of change in the noise floor of the base station. More particularly, determining the operating point may comprise obtaining a nominal noise value of the repeater; obtaining a nominal noise value of the base station; determining the ratio of a maximum output power of the base station and a maximum output power of the repeater; and determining the operating point using the nominal noise value of the repeater, the nominal noise value of the base station and the ratio.

In another aspect, an apparatus for setting total reverse link gain between a repeater and a base station comprises means for determining an operating point for the repeater; means within a coverage area of the repeater for establishing a reverse communication link to the base station; means for determining if an increase in a reverse link gain is substantially equal to an increase in a noise figure of the base station, based on a transmit power of the means for establishing the reverse communication link; and means for adjusting the reverse link gain by an amount based on the operating point and based on a difference in reverse link gain values, if the increase in the reverse link gain is substantially equal to the increase in the noise figure of the base station, to set the total reverse link gain. Here, the means for establishing the reverse communication link may be one of either a remote station circuitry or a transceiver device embedded in the repeater.

In still another aspect, a machine readable medium for use in setting total reverse link gain between a repeater and a base station may comprise a set of codes for determining an operating point for the repeater; a set of codes for establishing a reverse communication link between the base station and a transceiver device within a coverage area of the repeater; a set of codes for determining if an increase in a reverse link gain is substantially equal to an increase in a noise figure of the base station, based on a transmit power of the transceiver device; and a set of codes for adjusting the reverse link gain by an amount based on the operating point and based on a difference in reverse link gain values, if the increase in the reverse link gain is substantially equal to the increase in the noise figure of the base station, to set the total reverse link gain.

The means or set of codes for determining if the increase in the reverse link gain is substantially equal to the increase in the noise figure of the base station may comprise means or set of codes, respectively, for summing a reverse link gain value and corresponding transmit power value of the receiver device to obtain a first sum value; and means or set of codes, respectively, for increasing the reverse link gain value and re-summing the reverse link gain value and corresponding transmit power value to obtain a second sum value until a difference in the first and second sum values is obtained.

The means for adjusting the reverse link gain may adjust the reverse link gain by an amount based on the operating point and the difference in the first and second sum values. Alternatively, the means for adjusting the reverse link gain may adjust the reverse link gain by an amount based on the operating point and a difference in two reverse link gain values. The set of codes for adjusting the reverse link gain may comprise a set of codes for adjusting the reverse link gain by an amount based on the operating point and the difference in the first and second sum values. Alternatively, the set of codes for adjusting the reverse link gain may comprise a set of codes for adjusting the reverse link gain by an amount based on the operating point and a difference in two reverse link gain values.

In addition, the means or set of codes for determining if the increase in the reverse link gain is substantially equal to the increase in the noise figure of the base station may comprise means or set of codes, respectively, for monitoring the transmit power of the transceiver device; and means or set of codes, respectively, for determining when the transmit power becomes substantially constant with an increase in the reverse link gain. In still alternative embodiments, the means or set of codes for determining if the increase in the reverse link gain is substantially equal to the increase in the noise figure of the base station may comprise means or set of codes, respectively, for monitoring the transmit adjust value of the transceiver device; and means or set of codes, respectively, for determining when the transmit adjust value becomes substantially constant with an increase in the reverse link gain.

The means for adjusting the reverse link gain may adjust the reverse link gain by an amount based on the operating point and a difference in two reverse link gain values. The set of codes for adjusting the reverse link gain may comprise adjusting the reverse link gain by an amount based on the operating point and a difference in two reverse link gain values. Alternatively, the means or set of codes for adjusting the reverse link gain may comprise means or set of codes, respectively, for summing a reverse link gain value and corresponding transmit power value of the receiver device to obtain a first sum value; means or set of codes, respectively, for increasing the reverse link gain value and re-summing the reverse link gain value and corresponding transmit power value to obtain a second sum value; and means or set of codes, respectively, for adjusting the reverse link gain by an amount based on the operating point and the difference in the first and second sum values.

In a further aspect, a machine readable medium for determining a desired total reverse link gain between a repeater and a base station may comprise a set of code segments to obtain a first value that represents a desired amount of change in the noise floor of the base station; a set of code segments to obtain a second value that represents a measure of change in summing of reverse link gain values and corresponding mobile transmit power values; and a set of code segments for determining the desired total reverse link using the first and second values.

In still a further aspect, a method for setting total reverse link gain between a repeater and a base station may comprise determining an operating point for the repeater; establishing a reverse communication link between a transceiver device within a repeater coverage area to the base station; repeatedly summing reverse link gain values and corresponding transmit power values of the transceiver device to obtain sum values; and adjusting the reverse link gain by an amount based on the sum values and the operating point to set the total reverse link gain. The repeatedly summing may comprise summing a reverse link gain value and corresponding transmit power value of the receiver device to obtain a first sum value; and increasing the reverse link gain value and re-summing the reverse link gain value and corresponding transmit power value to obtain a second sum value until a difference in the first and second sum values is obtained; and wherein adjusting the reverse link gain comprises adjusting the reverse link gain by an amount based on the difference and the operating point.

In yet another aspect, an apparatus for setting total reverse link gain between a repeater and a base station may comprise a processor configured to determine an operating point for the repeater; a transceiver circuitry within a coverage area of the repeater coupled to the processor and configured to establish a reverse communication link to the base station; and a summing unit coupled to the processor and configured to repeatedly sum reverse link gain values and corresponding transmit power values of the transceiver device to obtain sum values; wherein the processor adjusts the reverse link gain by an amount based on the sum values and the operating point to set the total reverse link gain.

BRIEF DESCRIPTION OF THE DRAWINGS

Various embodiments will be described in detail with reference to the following drawings in which like reference numerals refer to like elements, wherein.

DETAILED DESCRIPTION

Embodiments are disclosed that allow the total reverse link gain between a repeater and base station to be set to a desired value. More particularly, algorithms are derived such that the current value of the total reverse link gain can be set to a desired value by adjusting the reverse link gain of the repeater. In the following description, specific details are given to provide a thorough understanding of the embodiments. However, it will be understood by one of ordinary skill in the art that the embodiments may be practiced without these specific detail. For example, circuits may be shown in block diagrams in order not to obscure the embodiments in unnecessary detail. In other instances, well-known circuits, structures and techniques may be shown in detail in order not to obscure the embodiments.

Also, it is noted that the embodiments may be described as a process which is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

In addition, the term "repeater" refers to a system or device that receives, amplifies, and retransmits a wireless signal without extracting the user information or converting the communication protocol. For example, Code Division Multiple Access (CDMA) base station receives and decodes CDMA signals to extract user information. The CDMA base station then transmits another signal with the extracted user information. The CDMA base station may use a different protocol to transmit the other signal.

Exemplary Operational Environment

Figure 1:
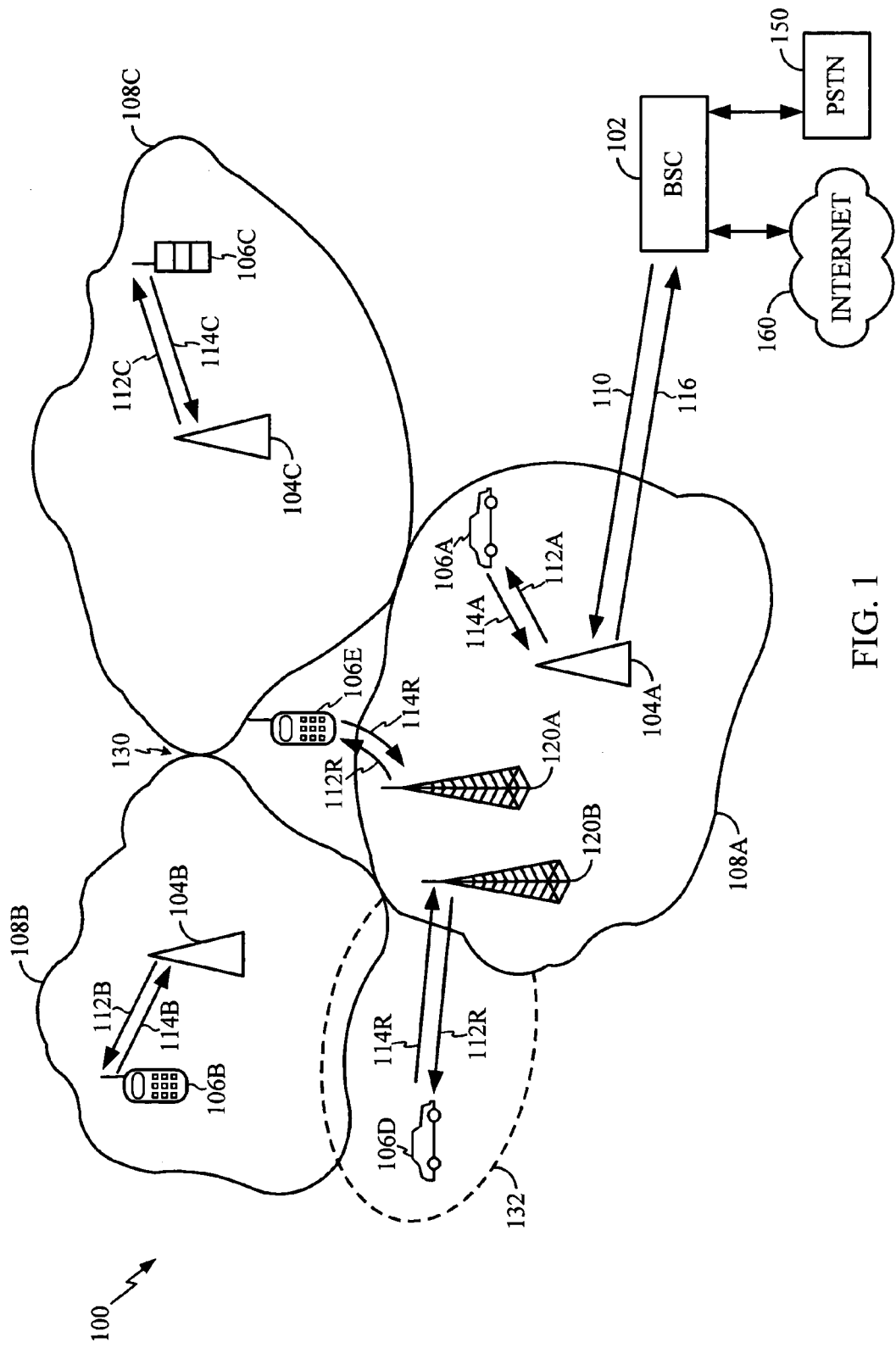
FIG. 1 is an example of a wireless communication network.

FIG. 1 illustrates an example of a wireless communication network (hereinafter "network") 100 using one or more control stations 102, sometimes referred to as base station controllers (BSC), and a plurality of base stations 104A-104C, sometimes referred to as base station transceiver system (BTS). Base stations 104A-104C communicate with remote stations or wireless communication devices 106A-106C that are within service areas 108A-108C of base stations 104A-104C, respectively. In the example, base station 104A communicates with remote station 106A within service area 108A, base station 104B with remote station 106B within service area 108B, and base station 104C with remote station 106C within service area 108C.

Base stations transmit information in the form of wireless signals to user terminals across forward links or forward link communication channels, and remote stations transmit information over reverse links or reverse link communication channels. Although FIG. 1 illustrates three base stations 104A-104C, other numbers of these elements may be employed to achieve a desired communications capacity and geographic scope, as would be known. Also, while fixed base stations are described, it is to be appreciated that in some applications, portable base stations and/or stations positioned on movable platforms such as, but not limited to, trains, barges or trucks, may be used as desired.

Control station 102 may be connected to other control stations, central system control stations (not shown) for network 100 or other communication systems such as a public switched telephone network (PSTN) 150 or the Internet 160. Thus, a system user at remote station 106 is provided with access to other communication portals using network 100.

Base stations 104A-104C may form part of terrestrial based communication systems and networks that include a plurality of PCS/cellular communication cell-sites. They can be associated with CDMA or TDMA (or hybrid CDMA/TDMA) digital communication systems, transferring CDMA or TDMA type signals to or from remote stations. Signals can be formatted in accordance with IMT-2000/UMTS standards, using WCDMA, CDMA2000 or TD-SCDMA type signals. On the other hand, base stations 104 can be associated with an analog based communication system (such as AMPS), and transfer analog based communication signals.

Remote stations 106A-106C each have or comprise an apparatus or a wireless communication device (WCD) such as, but not limited to, a cellular telephone, a wireless handset, a data transceiver, or a paging or position determination receiver. Furthermore, such remote stations can be hand-held, portable as in vehicle mounted (including cars, trucks, boats, trains, and planes) or fixed, as desired. In FIG. 1, remote station 106A is a portable vehicle mounted telephone or WCD, remote station 106B is a hand-held apparatus, and remote station 106C is a fixed device.

In addition, the teachings of the embodiments are applicable to wireless devices such as one or more data modules or modems which may be used to transfer data and/or voice traffic, and may communicate with other devices using cables or other known wireless links or connections, for example, to transfer information, commands, or audio signals. Commands may be used to cause modems or modules to work in a predetermined coordinated or associated manner to transfer information over multiple communication channels. Wireless communication device remote stations are also sometimes referred to as user terminals, mobile stations, mobile units, subscriber units, mobile radios or radiotelephones, wireless units, or simply as 'users,' 'phones,' 'terminals,' or 'mobiles' in some communication systems, depending on preference.

In the present example environment, remote stations 106A-106C and base stations 104A-104C engage in wireless communications with other elements in network 100 using CDMA communication techniques. Therefore, signals transmitted across the forward (to the remote stations) and reverse links (from the remote stations) convey signals that are encoded, spread, and channelized according to CDMA transmission standards. A forward CDMA link includes a pilot channel or signal, a synchronization (sync)-channel, one or more paging channels, and a number of traffic channels. The reverse link includes an access channel and a number of traffic channels. The pilot signal is used to alert mobile stations of the presence of a CDMA-compliant base station. The signals use data frames having a predetermined duration, such as 20 milliseconds. However, this is for convenience in description, and the embodiments may be employed in systems that employ other communications techniques, such as time division multiple access (TDMA), and frequency division multiple access (FDMA), or other waveforms or techniques as listed above, as long as the communication system or network provides for control of the mobile transmit power, such as by transmission of power control commands.

The wireless signals need to be transmitted at power levels sufficient to overcome noise and interference so that the transfer of information occurs within specified error rates. More particularly, for wireless communication systems, these signals need to be transmitted at power levels that are not excessive so that they do not interfere with communications involving other remote stations. Faced with this challenge, base stations and remote stations can employ dynamic forward link power control techniques to establish appropriate forward link transmit power levels.

Remote stations 106A-106C also adjust the power of the signals that they transmit over the reverse links of network 100, under the control of control station 102 or base stations 104A-104C. This power (referred to herein as reverse link transmit power) may be varied according to requests by or commands from a BTS, received signal strength or characteristics, or parameters for remote station operation, and according to time. This time varying feature may be employed on a frame-by-frame basis. Such power adjustments are performed to maintain reverse link bit error rates (BER) within specific requirements, reduce interference, and conserve transmission power.

Examples of techniques for exercising power control in such communication systems are found in U.S. Pat. No. 5,383,219, entitled "Fast Forward Link Power Control In A Code Division Multiple Access System," U.S. Pat. No. 5,396,516, entitled "Method And System For The Dynamic Modification Of Control Parameters In A Transmitter Power Control System," and U.S. Pat. No. 5,056,109, entitled "Method and Apparatus For Controlling Transmission Power In A CDMA Cellular Mobile Telephone System."

Service Areas

Each base station has a respective service area 108 (108A-108C) which can be generally described as the geographical extent of a locus of points for which a remote station 106 can communicate effectively with the base station. As an example, when a remote station 106 is within a service area 108, messages can be transmitted from control center 102 to a base station 104 (104A-104C) using a forward link 110 (110A-110C), and from base station 104 to a remote station 106 using a forward link 112 (112A-112C). Messages are transmitted from a remote station 106 to a base station 104 over a return link 114 (114A-114C). These messages are transmitted to the control center 102 using a return link 116 (116A-116C).

Some or all of the communications between a base station 104 and control station 102 can be carried over other wireless, such as microwave, radio, or satellite type links, or non-wireless transfer mechanisms such as, but not limited to dedicated wireline services, optical or electronic cables and so forth. Also, messages transmitted using forward links 110 and 112 may be modulated in different frequency bands or modulation techniques than the messages transmitted over reverse links 114 and 116. The use of separate forward and reverse links allows full duplex communications between the control center 102 and the remote station 106. TD-SCDMA systems use time division duplexing to accomplish the forward and reverse links, so a repeater could be implemented using either time division duplexing or frequency division duplexing.

The service area of a base station is illustrated as generally circular or elliptical in FIG. 1 for convenience. In actual applications, local topography, obstructions (buildings, hills, and so forth), signal strength, and interference from other sources dictate the shape of the region serviced by a given base station. Typically multiple coverage areas 108 (108A-108C) overlap, at least slightly, to provide continuous coverage or communications over a large area or region. That is, in order to provide an effective mobile telephone or data service, many base stations would be used with overlapping service areas.

One aspect of the communication network coverage illustrated in FIG. 1, is the presence of an uncovered region 130, which can often be referred to as a hole, or an uncovered region 132, which is simply outside of network 100 normal coverage areas. In the case of a "hole" in coverage, there are areas surrounding or at least adjacent to the covered areas, which can be, serviced by base stations, here base stations 104A-104C. However, as discussed above a variety of reasons exist for which coverage might not be available in regions 130 or 132.

For example, the most cost effective placement of base stations 104A-104C might place them in locations that simply do not allow their signals to reliably reach or cover regions 130 or 132. Alternatively, topological features such as mountains or hills, man made structures, such as tall buildings or urban canyons often created in central urban corridors, or vegetation, such as tall trees, forests, or the like, could each partially or completely block signals. Some of these effects can be temporary, or change over time, to make system installation, planning, and use even more complex.

In many cases, it may also be more amenable to using several repeaters to cover unusually shaped regions or circumvent the problems of blockage. In this situation, one or more repeaters 120 (120A, 120B) accept transmissions from both a remote station 106 (106D and 106E) and a base station 104 (104A), and act as an intermediary between the two, essentially operating as a "bent pipe" communication path. Using a repeater 120, the effective range of a base station 104 can be extended to cover service areas 130 and 132.

While the use of repeaters 120 is a more cost effective way to increase range or coverage for base stations, it has some disadvantages. One major disadvantage is the increase in noise for base stations servicing or using the repeater. This increase in noise may diminish the receive or reverse link coverage area of base station 104.

Repeater Overview

Figure 2:
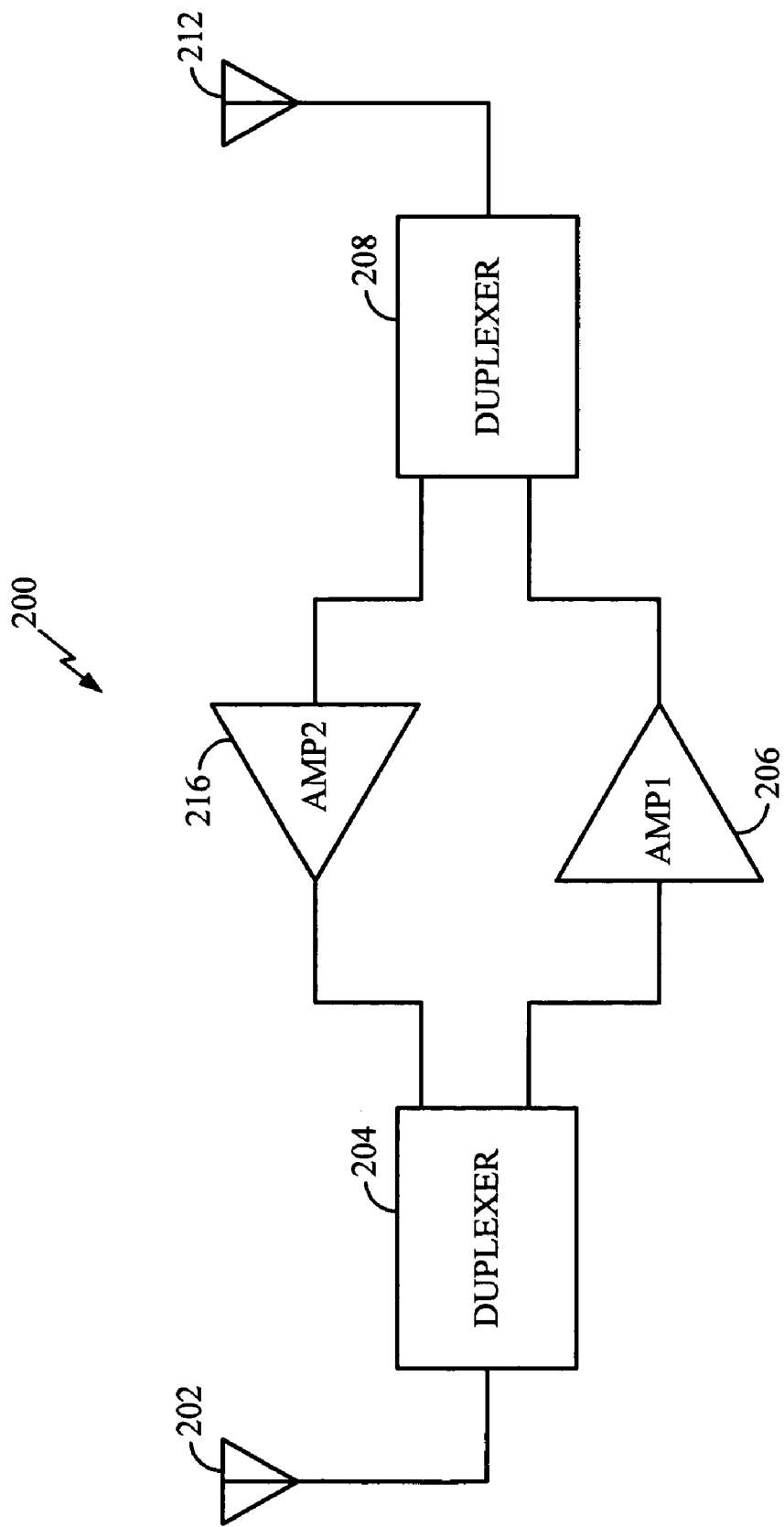
FIG. 2 is an example of a basic repeater.

FIG. 2 shows a simplified block diagram of a repeater 200. A more typical commercial repeater may have additional components including additional filtering and control elements to control noise, out of band emissions, and to regulate the gain. Moreover, the repeater may be a repeater that is in communication with a base station wirelessly or by a direct connection such as coaxial cable, fiber optic cable, electronic cable or other cable(s).

Repeater 200 may comprise an antenna 202 for receiving signals from a base station, a duplexer 204, an amplifier 206 for amplifying signals received at antenna 202, a second duplexer 208, and a second antenna 212 for transmitting (or repeating) signals received by antenna 202. A second amplifier 216 may also be included which amplifies signals received at server antenna 212, and provides the amplified signals to antenna 202 for transmission. Thus, both antenna 202 and 212 may receive and transmit signals. However, separate antennas may be implemented to receive and to transmit signals.

Duplexers 204 and 208 are used to split or separate the forward link and reverse link signals (frequencies) to provide necessary isolation between the two so that they do not enter the other processing chains of repeater 200. That is, to prevent transmissions from entering receivers, and so forth, and degrading performance. Duplexer 204 is coupled to antenna 202 referred to as a donor antenna, since it receives signals "donated" from another source, such as a base station, also referred to as a donor cell. The donor is more typically not a cell or cell site but a sector within a cell being handled by the donor base station. Antenna 212 coupled to duplexer 208 on the transmission or output side of the repeater processing is referred to as the server or coverage antenna. It would be apparent to those skilled in the art that server antenna 212 may act as a donor antenna to receive signals from a based station and donor antenna 202 may act as a server antenna by transmitting (or repeating) signals received by antenna 212.

System Model

Figure 3:
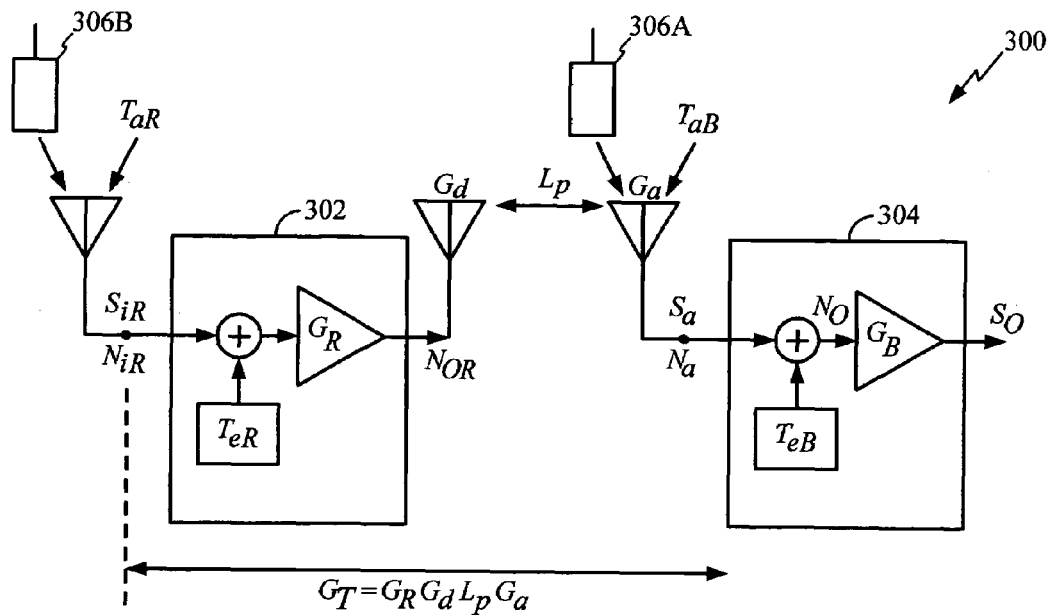
FIG. 3 is an example of a communication system comprising at least one repeater.

FIG. 3 shows a communication system 300 comprising remote or mobile station (MS) 306A and MS 306B communicating through a base station (BS) 304 and a repeater 320, respectively. That is, a functional and parameter based replica of the operations performed within system 300 is shown. Some parameters used in the model are shown in Table I.

TABLE I

| Parameter | Definition |
|---|---|
| | Repeater |
| $T_{aR}$ | Input antenna temperature of repeater |
| $T_{eR}$ | Inherent noise temperature of repeater |
| $S_{iR}$ | Signal power at input of repeater |
| $N_{iR}$ | Noise power density at input of repeater |
| $N_{OR}$ | Noise power density at output of repeater |
| $G_R$ | Reverse gain of repeater |
| $G_d$ | Gain of repeater donor antenna |
| | Path Loss between BTS and Repeater |
| $L_p$ | Path loss between repeater donor antenna and BTS antenna |
| | Base Station |
| $G_a$ | BTS antenna gain |
| $T_{aB}$ | BTS antenna temperature |
| $S_a$ | BTS antenna connector signal power |
| $N_a$ | Repeater additive noise density, ($N_a = kT_{eR}G_t$) |
| $G_B$ | BTS gain |
| $S_O$ | BTS output signal power |
| $N_O$ | Total noise power density at BTS output |
| $T_{eB}$ | Inherent noise temperature of BTS |
| $G_T$ | BTS-repeater or total reverse link gain, $G_T = G_R G_d L_p G_a$ (assuming negligible cable losses, which could be added) |

Under zero-load conditions, it can be shown that the effective noise figure $EF_R$ looking into repeater 320 is as follows, where $F_R$ is the nominal noise figure of repeater 320 and $F_B$ is the nominal noise figure of BS 304:

$$EF_R = F_R + \frac{F_B}{G_T} \quad [1]$$

Similarly, it can be shown that the effective noise figure $EF_B$ looking into BS 304 is as follows:

$$EF_B = F_B + G_T \cdot F_R \quad [2]$$

The derivation of Equations [1] and [2] is described in co-pending U.S. patent application Ser. No. 10/300,969, entitled "Reverse Link Power Controlled Repeater" which is assigned to the assignee of the present application and will not be discussed in detail.

Figure 4:
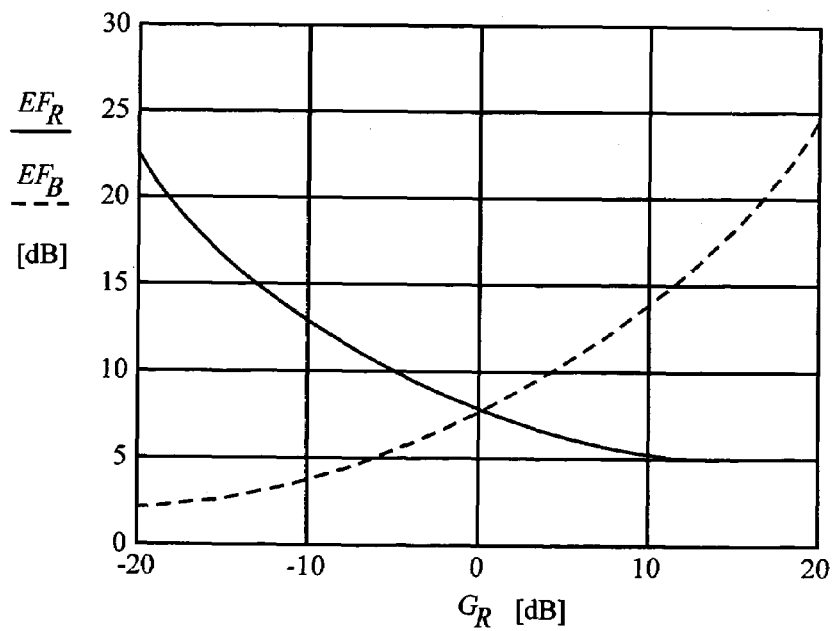
FIG. 4 illustrates the effective base station and repeater noise figure versus total link gain.

Equation [2] shows that the effective input noise figure of BS 304 is a function of the nominal noise figure of BS 304 and the product of total gain between repeater 302 and BS 304 with the noise figure of repeater 320. FIG. 4 shows the effective noise figure of repeater 302 and the effective noise figure of BS 304 plotted as a function of total gain $G_T$. The example case shown is that of a 5 dB nominal noise figure repeater and a 2.5 dB nominal noise figure BS. In the example, note that the effective input noise figures of the BS and repeater are equal, regardless of their inherent noise figures, when the total gain is 0 dB. At this point, the effective input noise figures are equal to the sum of the individual noise figures. In this example that value is approximately 6.94 dB.

From equations [1] and [2] as well as FIG. 4, it can be seen that it is not possible to have minimum or nominal noise figure at both repeater 320 and BS 304. If the performance of one is improved, then the other is impacted. Thus, the specific operating point to select may be a function of several factors, including which of the links (BS or repeater) is most critical to network operation and which link requires the greatest reverse link coverage capability. For example, a repeater used to provide in-building coverage should generally have a higher noise figure than that of a typical BS.

Operating Point of Repeater

Disclosed are embodiments for setting the operating point based upon considerations of balancing the forward and reverse communication links of repeater 302. It is to be noted that the operating point may be set or determined based on other considerations and/or factors. Also, for purpose of explanation, the embodiments will be described within a CDMA system in which a transceiver circuitry is a mobile station or device. However, the scope of the embodiments is not limited to CDMA system and/or to mobile stations.

To set the operating point based on link balancing, a determination of what $EF_R$ value is required to balance the links is made. Balanced links will be defined as when the coverage of the forward link and the reverse link are approximately equal. The appropriate value of the $EF_R$ is a function of the forward link transmit power. To understand this better, the behavior of open and closed loop power control operation in a CDMA system will first be discussed.

Consider the open loop power control equation where $P_T$ is the mobile transmit power in dBm, $P_R$ is the mobile receive power in dBm and K is the power offset:

$$P_T = -P_R - K \quad [3]$$

In Equation [3], K is a constant and is assumed to have slightly different values depending on which frequency band is under consideration and in case of CDMA 2000, the specific radio configuration in use. For example, with cellular band CDMA (Band Class 0), K is equal to 73. For PCS band CDMA (Band Class 1), K assumes a value of 76. The specific values of K can be found in the appropriate standard. Also, Equation [3] approximates the detailed requirement specified in standards such as TIA/EIA-95 or CDMA2000. The exact expression includes additional configurable parameters. However, for simplicity and without loss of generality, the additional parameters may be assumed to equal zero.

Equation [3] determines the initial mobile transmit power during access attempts. Notice that the mobile transmit power is a function of the mobile received power without any direct control from a network or BS. Therefore, Equation [3] describes the open loop power control. Generally, the behavior described by Equation [3] is built into each CDMA MS. Even with configurable parameters, the behavior of the MS described by Equation [3] is not altered significantly. Furthermore, the configurable parameters may not be set on a sector by sector basis and are not easily manipulated during a call. In addition, the value of the constant K carries inherent assumptions about the transmit power of the base station relative to the receive sensitivity of the base station.

After a traffic state has been established by the MS, closed loop power control is established. Closed loop power control provides direct feedback to the MS from the network and BS to control the power of the MS over and above the transmit power implied by Equation [3]. Closed loop power control is described by a modification to the right side of Equation [3] as follows where $TX_{adj}$ is the mobile transmit adjust:

$$P_T = -P_R - K + TX_{adj} \quad [4]$$

The $TX_{adj}$ parameter is the running sum of the power control bits, generally in units of ±1 dB. To monitor balancing the forward and reverse communication links, an operating point for MSs in the repeater coverage area is established such that the average offset due to the power control bits (the mean for $TX_{adj}$) will be a known value. A typical value for an unloaded system may be approximately −7 dB. More particularly, to maintain consistent link balance throughout a network, an operating point should be established in the repeater coverage area such that the operation condition is relatively identical (approximately identical) to the operating condition found in the surrounding network area.

For example, assume that a network consists of a sector with a maximum transmit power of 25 W and a 5 dB noise figure for the BS receiver. These assumptions are tied to the value of K. In typical network installations, this corresponds roughly to overhead channels of 5 W. As the maximum forward link transmitter power is reduced from 25 W at a BS sector to 1 W or less for a typical indoor repeater, the power in the overhead channels is also reduced by this same factor. In this example, the reduction is from 25 W to 1 W which is a ratio of approximately 14 dB. However, the MS also reacts to the received signal power with the same rules defined in power control Equations [3] and [4]. Perceiving lower receive power as greater distance from the cell, the power control process defines a mobile transmit power that will complete the link to a 25 W cell with a 5 dB noise figure. In the case of a 1 W repeater, the lower signal strength is not due to a large path loss, but is due instead to a reduced transmitter power.

Assuming further that the 1 W repeater has the same 5 dB noise figure of 25 W BS, an unbalanced condition will result between the forward and reverse links. Namely, the reverse link coverage would be greater than the forward link. While closed loop power control may compensate for this condition, a step-like function to the power control loop may occur as a MS transitions from a balanced coverage of the outdoor network to an in-building repeater coverage which is unbalanced. More importantly, access attempts in the repeater coverage area are based on open loop estimates so that access probes will arrive at the BS at great signal power. This type of interference may be detrimental to the coverage and capacity of the BS sector. In addition, the unbalanced condition may be of concern when the MS is in soft handoff with a second PN that was balanced.

Accordingly, the operating point would be set such that the repeater coverage area mimics the link balance properties experienced by the MS in the outdoor cell coverage areas.

Referring back to the example of the 1 W repeater, link balance occurs if the effective input noise figure of the repeater is increased by approximately 14 dB. This makes the front-end of the repeater less sensitive such that the open loop and closed loop power control, described by Equations [3] and [4], are maintained at a similar operating point as the surrounding network. For the 1 W repeater, the desired effective input repeater noise figure is then 5+14=19 dB. Considering the graph shown in FIG. 4, the effective repeater noise figure of 19 dB requires a total link gain of approximately −16 dB. Also, FIG. 4 shows that low values of $G_T$ have little effect on the BS noise figure.

In theory, a total gain of −16 dB can be obtained by careful distribution of the gains of the repeater and the antennas in combination with the path loss to the given deployment location. After the repeater location is determined and the antenna types are chosen, it is generally the value chosen for the reverse link gain of the repeater that will define $G_T$. However, in reality, the precise path loss, antenna gains or even the precise reverse link repeater gain cannot be known without careful calibration. While the desired $G_T$ may be derived mathematically, it is not practical to expect to simply dial in the desired value. For this reason, manual techniques have been developed for the set up of repeaters.

For example, one can use common CDMA test equipment to observe average $TX_{adj}$ value in the network environment surrounding the repeater. With this value known, the repeater can be installed and the forward link gain can be set so that the desired repeater coverage area is achieved. Then the reverse link gain of the repeater can be adjusted so that the same average $TX_{adj}$ is achieved in the repeater coverage area as was found in the surrounding network. While it may be possible to manually adjust the reverse link gain to achieve link balancing, it would be time consuming as well as labor intensive. In addition, conditions such as the surrounding environment of the repeater may change and affect the reverse link gain over time.

Therefore, a value for the total reverse link gain $G_T$ is derived to produce communication links in the repeater area that match the link balanced in the surrounding network. Assuming that the surrounding network has been optimized so that a desired link balance has been established, then there is a condition in which $EF_B$ (in dB) and the maximum transmit power out of a sector, called $P_{OB}$ (in dB) are matched. If the maximum power out of the repeater is $P_{OR}$ (in dB), then $$P_{OB} - P_{OR} = X \quad [5]$$

where X represents, in dB, how much the repeater noise figure should be increased from that of a typical BS ($EF_B$) in order to balance the links. If $EF_B$ provides a balanced link to the surrounding network, then an effective repeater input noise figure as follows will provide the same link balance in the repeater in the repeater coverage area.

$$EF_R = EF_B + X \quad [6]$$

Converting Equation [6] to linear units, $G_T$ may be described in terms of X as a quadratic expression with the following solution.

$$F_R + \frac{F_B}{G_T} = x_L F_B + x_L F_R G_T \quad [7]$$

where $x_L \equiv 10^{x/10}$ $$0 = G_T^2 F_R x_L + G_T (F_B x_L - F_R) - F_B \quad [8]$$

$$G_T = 1/x_L \quad [9]$$

Equation [9] gives an expression for the $G_T$ value that makes the link balance the same as the surrounding network. Also, since $x_L$ is defined by the ratio of the output powers of the BS sectors in the network and the output power of the repeater, the value of $G_T$ can be determined by calculation. The operating point for the repeater should be set by adjusting the link gain $G_T$ based on the physical parameters of $G_R$, $G_d$, and $G_B$ such that Equation [9] is or is approximately satisfied.

However, the choice of $G_T$ also has an effect on the noise floor of the BS as discussed above. Equation [2] shows that the noise floor of the BS sector will be increased by the factor of $G_T \cdot F_R$. If this factor is large relative to the nominal noise floor $F_B$, then there will be a rise of P dB in the BS noise floor. P may be defined as follows:

$$P = 10 \cdot \log\left(\frac{G_T \cdot F_R}{F_B}\right) \text{ [dB]} \quad [10]$$

Using Equation [10], the perturbation to the noise floor of the donor sector may be predicted. The quiescent noise figure of the repeater $F_R$ is typically known to the repeater installer. If $F_B$ is not known, a typical value, for example 5 dB, may be set as a default value for an unloaded sector. Therefore, with these values and a value of $G_T$, P may be predicted for balanced links at a BS donor sector.

Figure 5:
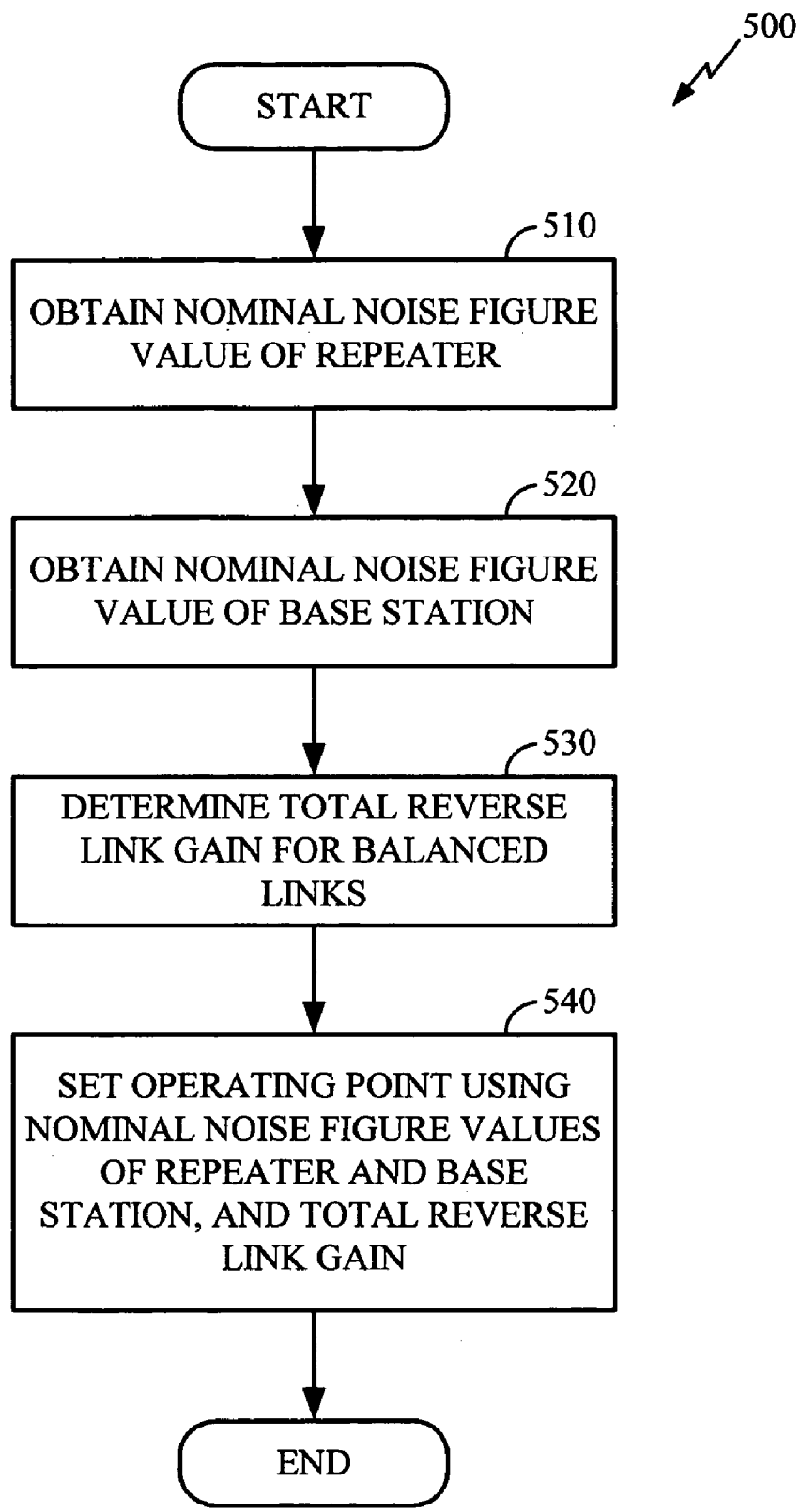
FIG. 5 shows an example process for determining an operating point of a repeater.

Based on the discussion above, a process 500 for determining an operating point of a repeater is shown in FIG. 5. The nominal noise figure value of the repeater $F_R$ in linear units or dB is obtained (510). The nominal noise figure value of BS $F_B$ in linear units or dB is also obtained (520). For purposes of setting a desired operating point, a value of $G_T$ that balances the forward and reverse communication link is determined (530). Here, $G_T$ may be determined using Equation [9] by determining the desired increase in the repeater noise figure X. Here, X may be obtained by the ratio of the maximum output power of the BS to the maximum output power of the repeater as shown in Equation [5]. A desired operating point can then be set (540) by using a value of P determined based on Equation [10].

Setting A Desired $G_T$

While a desired $G_T$ may be derived using Equation [9], it is not practical to implement. This is because a value for the path loss, the donor antenna gain and/or the BS antenna gain is difficult to obtain without great effort in time and labor. However, the following analysis allows $G_T$ to be set to a desired value. In the following analysis, constant loading conditions are assumed. This is sufficient since the measurements and repeater adjustments will be performed sufficiently fast such that loading will not have changed appreciably.

Figure 6:
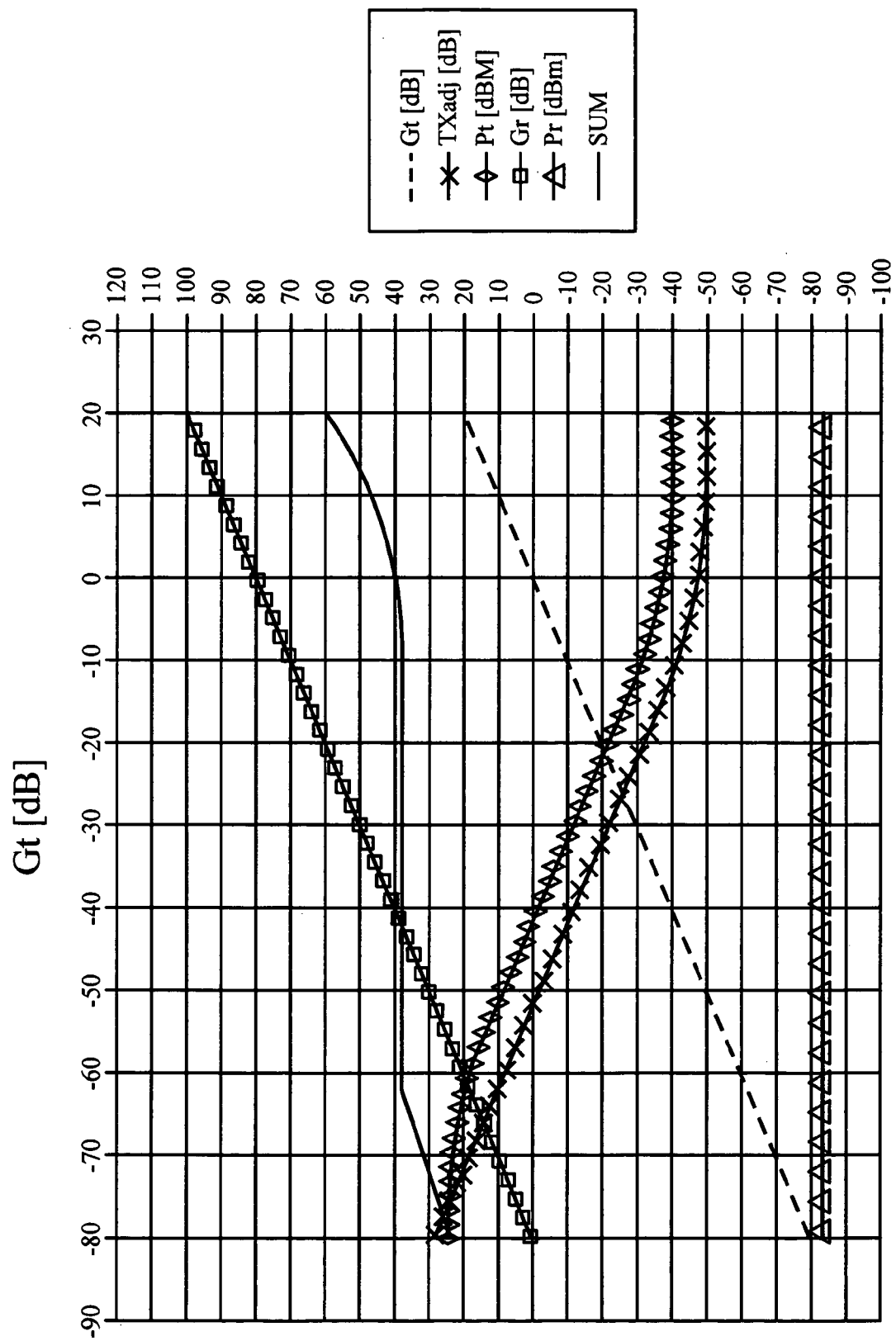
FIG. 6 illustrates the summation of transmit power and reverse link gain as a function of total link gain.

If a mobile transmit power $P_T$ is summed with the repeater reverse link gain $G_R$, in dB, the sum forms a linear function of $G_R$. The summation will appear to remain constant for low values of $G_R$. That is, it will appear to remain constant until the effective BS noise figure becomes dominated by the $G_T \cdot F_R$ term. This is illustrated in FIG. 6. For illustration the reverse link repeater gain $G_R$ is shown to vary from 0 dB to 100 dB even though 100 dB gain range is not typical. The intent is to illustrate the full range of operating conditions. As the repeater gain $G_R$ varies from 0 dB to 100 dB, the total link gain varies $G_T$ linearly from −80 dB to 20 dB. Note however that the offset between $G_R$ and $G_T$ is unknown in an actual repeater installation.

The mobile phone transmit power decreases proportionally to the increase in $G_R$ through the middle of the range. Mobile station transmit power is limited to approximately 23 dB in this example which is typical for IS-95 or CDMA2000 type mobile stations. Thus, except for low values of $G_R$ where $P_T$ is artificially held to some maximum value, the summation of $P_T$ and $G_R$ is flat until $G_T$ becomes large. Finally, as $G_R$ increases sufficiently, the effective noise figure of the BS becomes dominated by the $G_T \cdot F_R$ term of Equation [2]. This is indicated by the fact that the mobile transmit power is seen to become constant regardless of changes in $G_R$. It becomes constant because this is the pint at which the noise component (Equation [2]) and the signal component are both increasing equally with each increase in $G_R$. Since the signal to noise ratio at the BS receiver is not changing, power control does not command the mobile station to lower the mobile transmit power with increasing $G_R$. As a result, the summation of $G_R$ and $P_T$ begins to increase. In this example, this is seen to occur at values of $G_R$ in the range of approximately 75 to 85 dB or $G_T$ in the range of −5 dB to +5 dB.

More particularly, at low values of $G_R$, the sum S (in dB) of $P_T$ and $G_R$ is proportional to $F_B$ since the noise floor of the BS is dominated by the noise figure of the BS. Low values of $G_R$ represents a condition as if the repeater were not present. As $G_R$ is increased, a change R (in dB) in the summation S can be measured as explained below. Since S is proportional to $EF_B$, R can be written as follows:

$$R = EF_B - F_B \quad [11]$$

In linear units, this rise R in the value of S is as follows:

$$r = 10^{R/10} = \frac{F_B + G_T \cdot F_R}{F_B} \quad [12]$$

The procedure for setting a desired $G_T$ is as follows. If $G_R$ is increased until a change R in S is measured, then r is as follows, where $G_T^r$ is the unknown value of $G_T$ that yielded the measured rise R in S:

$$r = 10^{R/10} = \frac{F_B + G_T^r \cdot F_R}{F_B} \quad [13]$$

From Equation [13] above, equation [14] below is derived.

$$\frac{G_T^r}{r-1} = \frac{F_B}{F_R} \quad [14]$$

A desired change to the BS noise floor due to the introduction of the repeater is then selected. This selection may be based on considerations of the desired operating point of the repeater and the BS as discussed above. More particularly, in Section V, it was shown that a desired value for $G_T$ can be determined based on considerations of maintaining uniform link balance. A selected value of $G_T$ will produce a specific rise in the noise floor, P, of the BS as defined in Equation [10]. Thus, a determination is made to operate the repeater in such a manner that the noise floor of the BS is increased by P dB. A P dB change in the BS noise floor corresponds to a change in the effective noise figure of the BS of P dB. In linear units, the new desired effective noise floor corresponds to an increase by p from that which it would be without the repeater as follows where p is the linear equivalent of P dB such that $p = 10^{P/10}$:

$$EF_B = p \cdot F_B \quad [15]$$

To find the desired value of $G_T$, hereinafter called $G_T'$, which produces the desired noise floor at the BS, the following relation is formed:

$$F_B + G_T' \cdot F_R = p \cdot F_B \quad [16]$$

from which the following equation can be formed:

$$G'_T = (p-1) \cdot \frac{F_B}{F_R} \quad [17]$$

Substituting the relationship of Equation [14] that defines the current $G_T$ condition, $$G'_T = \frac{p-1}{r-1} \cdot G^r_T \quad [18]$$

Equation [18] indicates that the desired $G_T(G_T')$ is proportional to the current $G_T(G_T^r)$ by the proportionality factor of $(p-1)/(r-1)$. Therefore, to achieve the desired BS noise floor rise, the reverse link gain $G_R$ is adjusted from its current setting of $G_T^r$ as follows.

$$10 \cdot \log_{10}\left(\frac{p-1}{r-1}\right) \text{ (dB)} \quad [19]$$

In the description above, the sum S of $P_T$ and $G_R$ is monitored to determine if the noise figure of BS is dominated by the noise figure added by repeater. At such condition, the noise floor of the BS becomes dominated by the $G_T \cdot F_R$ term of Equation [2] and the difference R in the sum S may be used to adjust $G_R$ based on Equation [19]. In alternative embodiments, the mobile transmit power $P_T$ or transmit adjust value $TX_{adj}$ may also be monitored to determine if the noise figure of BS is dominated by the noise figure added by repeater. Such condition occurs when the mobile transmit power or the mobile transmit adjust value, respectively, becomes a constant value regardless of an increase in $G_R$. Accordingly, one or more of these three attributes (the summation, mobile transmit power or mobile transmit adjust value) can be used as an indication that the noise floor of the BS has become dominated by the repeater's added noise.

Figure 7:
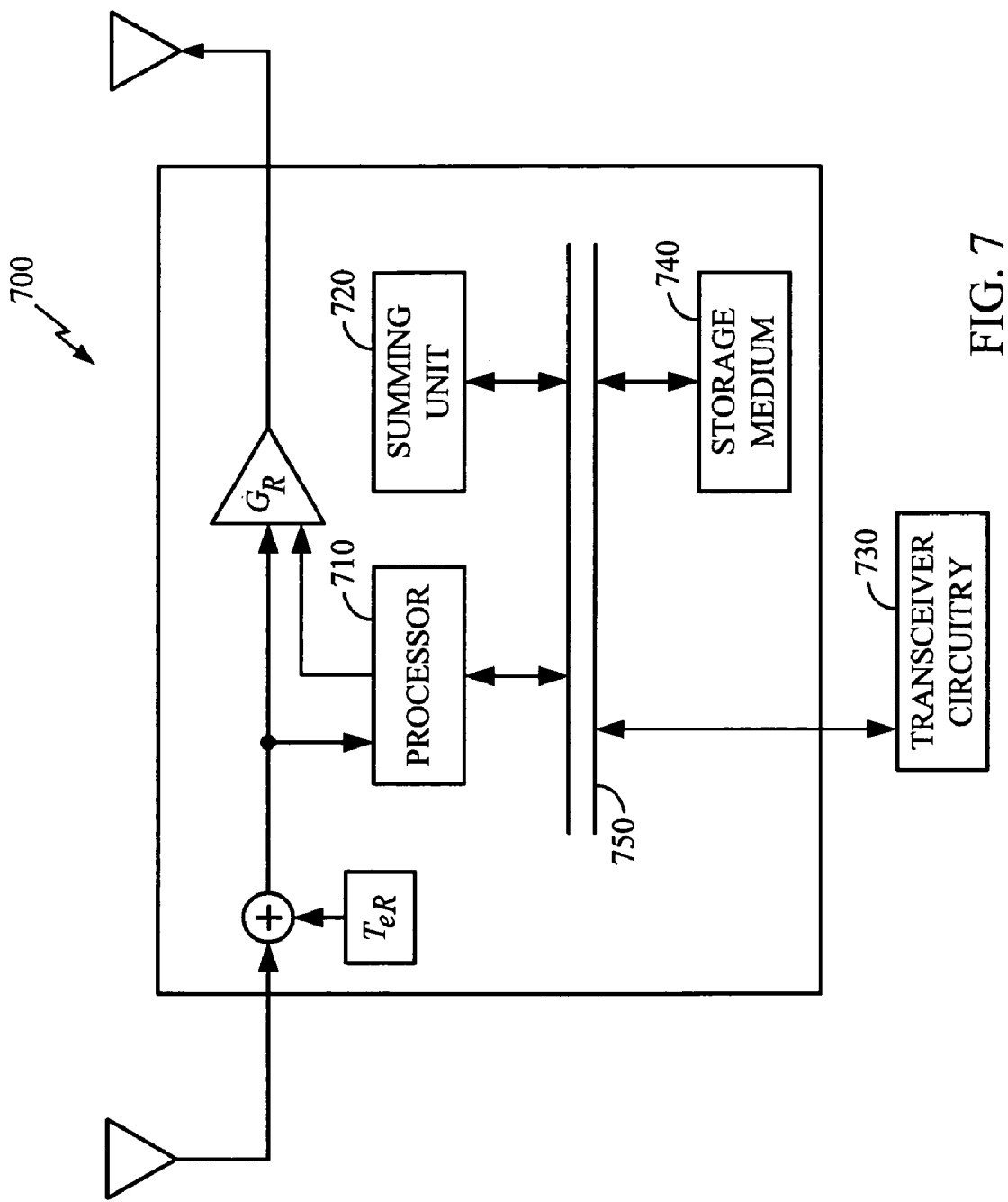
FIG. 7 is an example repeater system that allows the total link gain to be set.

FIG. 7 shows a repeater system 700 that can adjust $G_R$ to set $G_T$ to a desired value. System 700 may comprise processor 710, a summing unit 720, a transceiver circuitry or device 730 within the repeater coverage area, and storage unit 740 coupled by a bus 750 in addition to the elements as shown in FIG. 3. Note that repeater system 700 is simplified for purposes of explanation. Therefore, a more commercial repeater system may comprise additional components. Also, it would be apparent to the skilled in the art that the elements may be rearranged without affecting the operation of repeater system 700.

Figure 8:
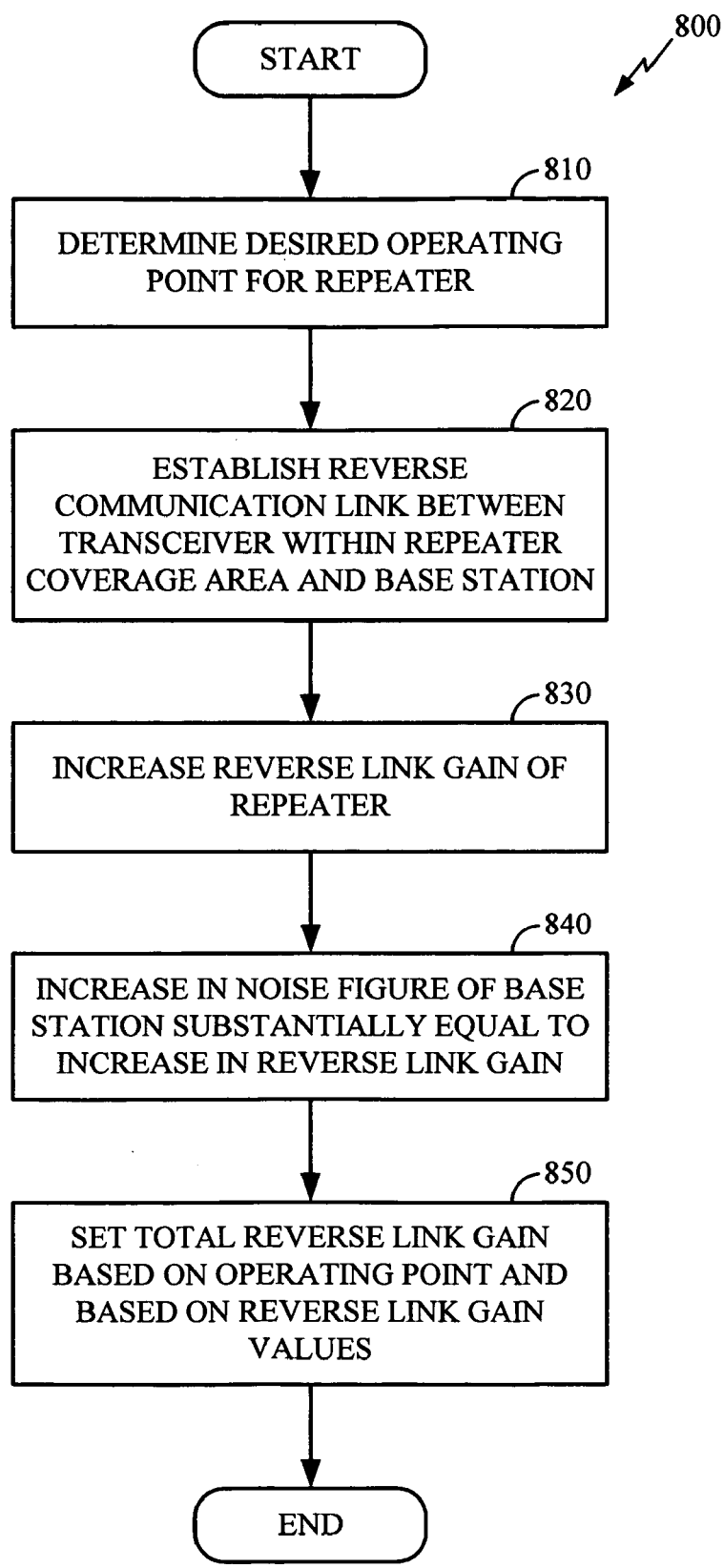
FIG. 8 shows an example process for setting the total link gain.

Processor 710 may be a device or circuitry such as a central processor, microprocessor or a digital signal processor to control summing unit 720 and transceiver circuitry 730. Transceiver circuitry 730 may be implemented using circuitry that is analogous to a remote station or wireless communication device to generate transmit power. Storage medium 740 may represent one or more devices for storing data, including read only memory (ROM), random access memory (RAM), magnetic disk storage mediums, optical storage mediums, flash memory devices and/or other machine readable mediums. The term "machine readable medium" includes, but is not limited to portable or fixed storage devices, optical storage devices, wireless channels and various other devices capable of storing, containing or carrying instruction(s) and/or data. The operation will be described with reference to a process 800 to set $G_T$ as shown in FIG. 8.

Generally, the desired operating point P for repeater system 700 is determined (810) by processor 710. The desired operating point may be determined based upon link balancing and/or some other desired amount of change in the noise floor of a base station. For example, Equation [10] may be used to obtain P value that will balance the forward and reverse links. Alternatively, a value of P may be selected using other considerations, factors, and/or knowledge. A reverse communication link is established (820) between transceiver circuitry 730 and a BS. Here, the reverse communication may be initiated by transceiver circuitry 730 or by the BS. The reverse link gain of repeater ($G_R$) is then increased (830) to detect for a condition when the noise figure of the BS is dominated by the noise added by the repeater. If it is determined (840) that the noise figure of the BS is dominated by the noise added by the repeater, the total reverse link gain may be set (850) based on the desired operating point and based on the reverse link gain values.

More particularly, the noise figure of the BS is determined to be dominated by the noise added by the repeater when an increase in the noise figure of the BS is substantially equal to an increase in the reverse link gain. In one embodiment, the condition when the increase in the noise figure of the BS is substantially equal to the increase in the reverse link gain may be determined by monitoring the sum values of the reverse link gain values and corresponding transmit power values. To monitor the sum values, the reverse link gain values and corresponding transmit values of the transceiver circuitry 730 are repeatedly summed to obtain sum values. Namely, the reverse link gain value is increased, and the reverse link gain value and corresponding transmit power value are summed to obtain first and second sum values until a difference R in the sum values is obtained. At such point, the increase in the noise figure of the BS is determined to substantially equal the increase in the reverse link gain. Moreover, the reverse link gain may then be adjusted by an amount based on the difference R and the operating point P according to Equation [19].

In alternative embodiments, the condition when the increase in the noise figure of the BS is substantially equal to the increase in the reverse link gain may be determined by monitoring the mobile transmit power of the transceiver circuitry 730 or by monitoring the mobile transmit adjust value received by the transceiver circuitry 730. When the mobile transmit power becomes substantially constant with an increase of the reverse link gain, the increase in the noise figure of the BS is determined to substantially equal the increase in the reverse link gain. Similarly, when the mobile transmit adjust value becomes substantially constant with an increase of the reverse link gain, the increase in the noise figure of the BS is determined to substantially equal the increase in the reverse link gain.

When a constant value of the mobile transmit power and/or mobile transmit adjust value is detected, the total reverse link gain may be set by adjusting the reverse link gain value to obtain a difference R in two sum values of the reverse link gain values and corresponding transmit power values, and by adjusting the reverse link gain by an amount based on the difference R and the operating point P according to Equation [19]. Here, the reverse link gain value may be increased or decreased to obtain the difference R. Note that when the increase in the noise figure of the BS is substantially equal to the increase in the reverse link gain, a difference in the sum values would result. Also, note that when the mobile transmit power and/or mobile transmit adjust value becomes constant, the change in the reverse link value corresponds with the different R in the sum values. Accordingly, when the increase in the noise figure of the BS is determined to substantially equal the increase in the reverse link gain, the total reverse link gain may be set by adjusting the reverse link value to obtain a difference D in the reverse link gain values, and by adjusting the reverse link gain by an amount based on the operating point P and the difference D in place of the difference R according to Equation [19].

In process 800, storage medium 740 may store the P value, the reverse link gain value and/or the transmit power value before the summing. Also, the reverse link gain value and corresponding mobile transmit power value is summed by summing unit 720. Moreover, the reverse link gain value may be increased by one of a plurality of different amounts. For example, the reverse link gain value may be increased initially by a first amount Y then later by a second amount Z. The value of Y may be in the range of approximately 3 to 5 dB. The reverse link gain is then adjusted by an amount based on the difference and the desired operating point. Here, processor 710 may control the reverse link gain to increase and/or to adjust the gain value.

Furthermore, processor 710 may determine when the increase in the noise figure of the base station is substantially equal to the increase in the reverse link gain by monitoring the sum values, mobile transmit power and/or mobile transmit adjust value. When such condition is determined and/or when monitoring the sum values, the transmit power and/or reverse link gain value values may be measured by processor 710 and transferred to summing unit 720. Alternatively, the mobile transmit power and/or reverse link gain values may be measured and summed as necessary by summing unit 720. Also, after establishing the communication link, the reverse link gain may be reduced to a selected minimum value at which the link can still be maintained. In addition, the mobile transmit power is set such that the transmit power is not at a maximum or some high value. Otherwise, the operation point is on the linear portion of the mobile transmit power to reverse link gain summation curve shown in FIG. 6.

Transceiver circuitry 730 may be implemented separately within repeater 700 or externally, but within the coverage area of repeater 700. Transceiver circuitry 730 may also be embedded in repeater 700. Moreover, either one or more of processor 710, summing unit 720, transceiver circuitry 730 and storage medium 740 may be implemented on one or more apparatus or circuit card or board assembly. Also, one or more of processor 710, summing unit 720, transceiver circuitry 730 and storage medium 740 may be coupled directly and not by bus 750. Accordingly, in some embodiments, bus 750 may be omitted. Transceiver circuitry 730 may be a remote station or wireless communication device. In such case, a call from the remote station to the network can be initiated by an entity on the network side. The call could also be initiated automatically by the repeater. The length of the call may be short, for example approximately 2 to 5 seconds on average. During the call, the transmit power and reverse link gain may be obtained to set the total reverse link gain as described above.

Applications

Being able to set the total reverse link gain may be used in various applications. When a repeater is installed, the total reverse link gain is set. Also, when forward communication link gain changes, the total reverse link gain may be reset for link balancing. In one embodiment, a power controlled repeater as discussed below may be implemented to control the total reverse link gain.

Installation

To install a repeater, the forward communication link gain is set to a desired value. This may be performed manually. The value of the forward communication link gain may be based on the output power required for coverage in the desired repeater coverage area. A reverse communication link or a call is then established from the repeater coverage area. After establishing the link or call, one of the sum value, mobile transmit power or the mobile transmit adjust value may be monitored.

When monitoring the sum value after establishing the link or call, the value of transmit power and reverse link gain is obtained or measured and may be recorded. The transmit power and reverse link is summed to obtain S. The reverse link gain is then increased and obtained to be summed with corresponding transmit power. The new sum value is compared to the previous sum value to determine if there is a change. If there is no change, the reverse link gain is increased repeatedly and summed with corresponding transmit power until a change of R dB has been detected in the summation S. When R has been measured, Equation [19] is used to set $G_R$ to the desired value relative to the current value.

When monitoring the mobile transmit power or the mobile transmit adjust value, after establishing the link or call, a substantially constant transmit power or mobile transmit adjust value is detected as the reverse link gain is increased. If the transmit power of mobile transmit adjust value becomes substantially constant, the difference or change in gain represents R dB used in Equation [19] to set $G_R$ to the desired value relative to the current value.

Power controlled Repeater

In a power controlled repeater, a remote station circuitry such as a subscriber unit is embedded inside a repeater. This is described in co-pending U.S. patent application Ser. No. 10/300,969. Generally, the remote station circuitry is configured in such a way so as to control the reverse link gain of the repeater. Although the remote station may be various wireless communication devices, for purposes of explanation, the embodiment will be described using a mobile phone. The embedded phone controls the reverse link gain based on the power control commands that are received from the network. The power control commands from the network are designed to optimize the receive signal power from the mobile so that it arrives at the BS with sufficient power for the signal to be demodulated. This same control can be used to set the reverse link gain of the repeater.

The call from the embedded phone to the network may be initiated by an entity on the network side. The call could also be initiated automatically by the repeater. The length of the call may be short, for example approximately 2 to 5 seconds on average. A call is placed to the repeater (or by the repeater) at regular intervals during the day in order to continuously manage the repeater to BS link.

Referring back to FIG. 3, total reverse link gain $G_T$ is modeled as comprising four components. The BS antenna gain, the path loss between the BS and the repeater, the donor antenna gain, and the reverse gain of the repeater. After the antennas are mounted and pointed, the antenna gains can be assumed stable in the short term. In the long term, conditions such as snow, ice and corrosion can make these gains change. Assuming a fixed location and a line of sight path, the path loss between the repeater and the BS should also remain constant. If the path between the repeater and the BS is not line of sight, then changes in the clutter environment will likely cause this loss to vary. These variations will directly affect the total link gain, $G_T$. Finally, variations in the repeater gain due to changes in the amplifier chain will result in variations to $G_T$.

Power control may be used to maintain a consistent total reverse link gain, $G_T$ between the BS and the repeater. To maintain repeater link balance, any change to the forward communication link gain (GF) requires adjustment to the reverse link gain. The forward link gain may change due to various reasons, one of which is some change in the path loss, $L_P$. Another reason is some change in the repeater forward gain electronics, for example, due to gain fluctuations as a function of temperature.

To operate, the embedded phone is brought into the traffic state. Namely, closed loop power control commands are sent to the phone. The embedded phone is configured in such a way that the reverse link transmit signals are carried through the entire reverse link gain states of the repeater. In this way, the received signal at the BS will reflect the gain found in the repeater. If the gain of the repeater has drifted, or if the path loss between the repeater and the BS has changed, these changes will be reflected in the closed loop power control commands that are sent to the embedded mobile station. In normal CDMA phone operation these power control commands would cause the MS to adjust its transmit power. In the case of the power controlled repeater, the power commands to the embedded phone will cause the gain of the entire repeater to change. In this way, the feedback provided by the network is used to compensate for any changes in the gain chain of the repeater or any changes in the path loss between the repeater and the BS.

Therefore, to adjust the reverse link gain, a call is established by the embedded phone. After establishing the call, the value of transmit power and reverse link gain is obtained or measured and may recorded. The transmit power and reverse link is summed to obtain S. The reverse link gain is then increased and obtained to be summed with corresponding transmit power. The new sum value is compared to the previous sum value to determine if there is a change. If there is no change, the reverse link gain is increased continuously and summed with corresponding transmit power until a change of R dB has been detected in the summation S. When R has been measured, Equation [19] is used to set $G_R$ to the desired value relative to the current value to set $G_T$. Here, in addition to monitoring the sum value to adjust the reverse link gain, the transmit power or the mobile transmit adjust value may be monitored after establishing the link or call, as described above, to adjust the reverse link gain.

It should be noted that the mobile phone transmit power, $P_T$ decreases as the repeater reverse link gain is increased. If $G_R$ is increased, $G_T$ also increases. As $G_T$ increases, the signal to the BS increases. It is the function of network power control to maintain a constant receive signal power at the BS. Thus, for each unit increase in $G_R$, an equivalent unit decreases in $P_T$. This one for one trade off between $G_R$ and $P_T$ will hold as long as the noise floor at the BS remains constant.

The noise floor of the BS remains constant under constant loading conditions. It also remains constant for constant $G_T$ and equivalently for constant $G_R$. This can be seen by Equation [2]. Since this equation describes the effective noise figure seen looking into BS by mobiles in BS coverage, it also represent the rise in the BS noise floor as a function of total repeater reverse link gain $G_T$. From Equation [2], it can be seen that as $G_R$ is increased (which increases $G_T$), the noise floor of the receiver will eventually be dominated by the noise added by the repeater. It is at this point that each unit change in $G_R$ increases both the signal level and the noise level that defines the minimum required signal a the BS. When this condition takes effect, each unit change in $G_R$ has no change in the mobile transmit power $P_T$ since both the signal and the noise are increasing equally. This condition will continue until BS reduces the BS receiver gain.

Figure 9:
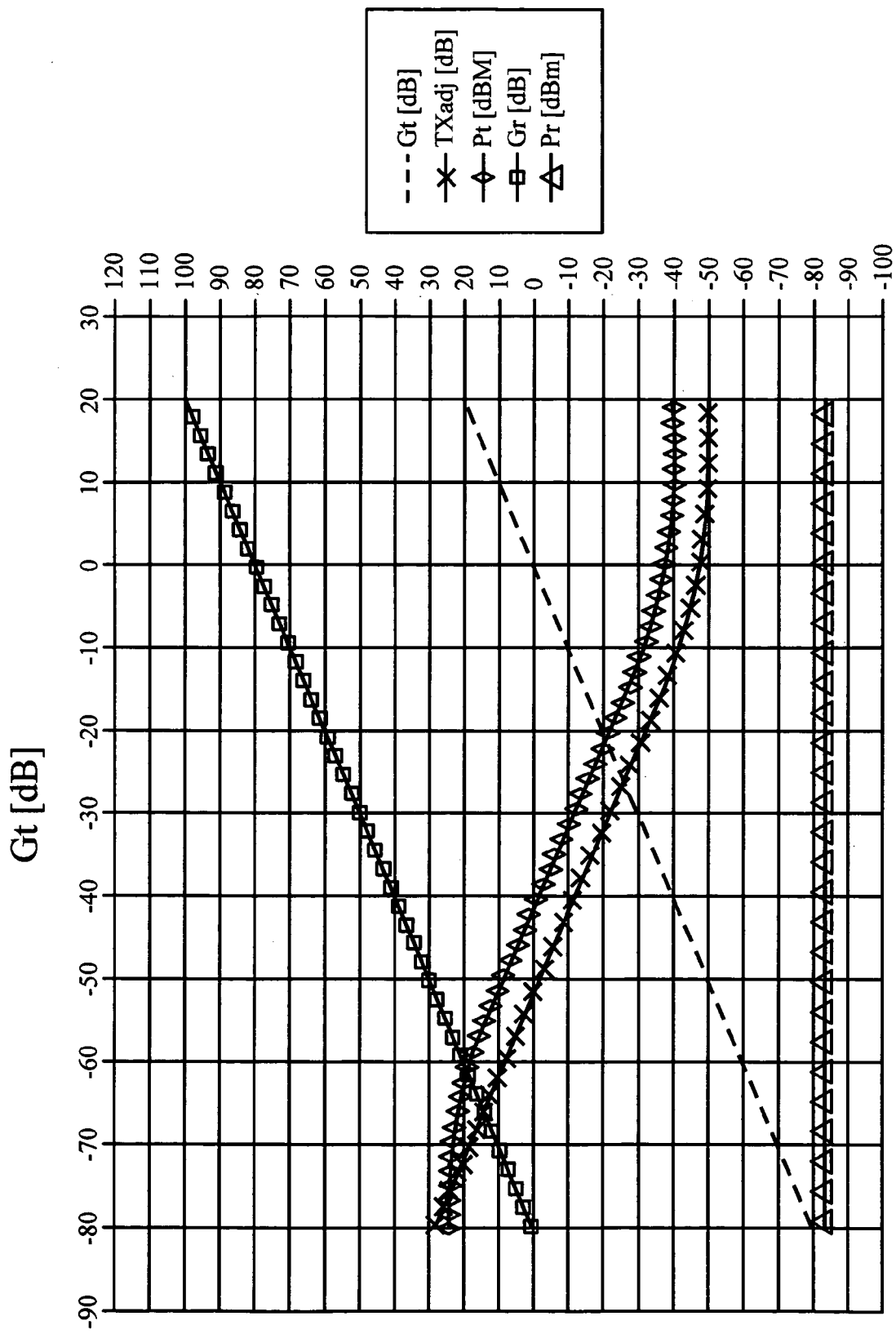
FIG. 9 illustrates a mobile station performance as a function of total link gain.

For example, FIG. 9 shows processes of an embedded phone. This figure was produced using some exemplary values for the gains and losses as in FIG. 6. Accordingly, the reverse link repeater gain $G_R$ is shown to vary from 0 dB to 100 dB and corresponding total link gain $G_T$ varies linearly from −80 dB to 20 dB. Also, notice that the mobile receive power $P_R$ is constant. This presumes that the forward link repeater gain is constant and that the path loss $L_P$ is constant. In addition, the mobile phone transmit power decreases proportionally to the increase in $G_R$ through the middle of the range. Because mobile station transmit power is limited to some value, the $P_T$ curve is flat at low values of $G_R$. As $G_R$ increases sufficiently, the effective noise figure of the BS becomes dominated by the $G_T \cdot F_R$ term of Equation [2]. This is indicated by the fact that the mobile transmit power is seen to become constant regardless of changes in $G_R$. In this example, this is seen to occur at values of $G_R$ in the range of approximately 10 to 20 dB. Finally, note that the mobile transmit adjust $TX_{adj}$ follows the mobile transmit power as it functions to maintain the required signal to noise ratio received at the BS constant.

To illustrate further the operation of the power control repeater, consider what happens if the path loss between the repeater and the BS changes and how the power control repeater reacts. First, assume that the repeater has been set-up and an operating point has been established. If the path loss between the BS and repeater changes, then the repeater will adjust its gain to return to the operating point. For example, the path loss was to decrease by 5 dB, then the power received by the embedded mobile will increase by 5 dB. The closed loop power control Equation [4] dictates that the embedded phone will transmit 5 dB less. This will be accomplished by reducing the gain of the repeater by 5 dB. This adjustment will occur during the next phone call to the embedded phone.

Also, consider the operation of the power control repeater if the noise figure of the BS changes. This is one way of modeling the changes at the BS with loading. As more MS signals arrive at the BS, the noise floor of the BS begins to rise. This can be thought of as a change in the noise figure of the BS. If the BS noise figure increases, as a result of increased loading, then the MS signals from the repeater will need to transmit more energy in order to be heard. This correction in the traffic state embedded phone will be controlled by the network per Equation [4]. If the received signal to noise ratio from embedded phone is too low, perhaps due to an increase in noise with loading, the embedded phone will be commanded to turn up via power control commands. That is, $TX_{adj}$ will reflect an adjustment of power so that the signals arrive at the BS at the correct level. This adjustment of power is accomplished through changes in gain of the repeater. In this way, all of the mobiles using the repeater will also have their gain to the BS adjusted to compensate for the change in loading. Note that this effect provides a very stable environment for the remote stations in the repeater coverage area such that their mobile transmit power will not vary with loading changes at the BS. The repeater provides the gain manipulations required to compensate for changes in loading.

CONCLUSION

As described above, the total reverse link gain is difficult to set. Some manual techniques have been developed to set up repeaters. For example, test equipment may be used to observe the average TX$_{adj}$ value in a network environment surrounding a repeater. With this value known, the repeater can be installed and the forward link gain set so that a desired repeater coverage area is achieved. The reverse link gain of the repeater is then adjusted, generally by a try and error method, so that the same average TX$_{adj}$ is achieved in the repeater coverage area as was found in the surrounding network.

However, the disclosed embodiments allow the total reverse gain to be set to a desired value without or very little manual labor. Accordingly, the total reverse link gain can be set more efficiently and more accurately by the repeater. Moreover, very few additional elements are required to implement the embodiments. Therefore, the disclosed embodiments offer an expensive as well as easy to implement solution to control the total reverse gain.

Furthermore, embodiments may be implemented by hardware, software, firmware, middleware, microcode, or any combination thereof. When implemented in software, firmware, middleware or microcode, the program code or code segments to perform the necessary tasks may be stored in a machine readable medium such as storage medium 840 or in a separate storage(s) not shown. A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

It should be noted that the foregoing embodiments are merely examples and are not to be construed as limiting the invention. The description of the invention is intended to be illustrative, and not to limit the scope of the claims. As such, the present teachings can be readily applied to other types of apparatuses and many alternatives, modifications, and variations will be apparent to those skilled in the art.

What is claimed is:

1. A method for setting total reverse link gain between a repeater and a base station, comprising:
   determining an operating point for the repeater;
   establishing a reverse communication link between the base station and a transceiver device within a coverage area of the repeater;
   determining if an increase in a reverse link gain is substantially equal to an increase in a noise figure of the base station, based on a transmit power of the transceiver device; and
   adjusting the reverse link gain by an amount based on the operating point and based on a difference in reverse link gain values, if the increase in the reverse link gain is substantially equal to the increase in the noise figure of the base station, to set the total reverse link gain.

2. The method of claim 1, wherein determining if the increase in the reverse link gain is substantially equal to the increase in the noise figure of the base station comprises:
   summing a reverse link gain value and corresponding transmit power value of the receiver device to obtain a first sum value; and
   increasing the reverse link gain value and re-summing the reverse link gain value and corresponding transmit power value to obtain a second sum value until a difference in the first and second sum values is obtained.

3. The method of claim 2, wherein adjusting the reverse link gain comprises:
   adjusting the reverse link gain by an amount based on the operating point and the difference in the first and second sum values.

4. The method of claim 2, wherein adjusting the reverse link gain comprises:
   adjusting the reverse link gain by an amount based on the operating point and a difference in two reverse link gain values.

5. The method of claim 1, wherein determining if the increase in the reverse link gain is substantially equal to the increase in the noise figure of the base station comprises:
   monitoring the transmit power of the transceiver device; and
   determining when the transmit power becomes substantially constant with an increase in the reverse link gain.

6. The method of claim 5, wherein adjusting the reverse link gain comprises:
   adjusting the reverse link gain by an amount based on the operating point and a difference in two reverse link gain values.

7. The method of claim 5, wherein adjusting the reverse link gain comprises:
   summing a reverse link gain value arid corresponding transmit power value of the receiver device to obtain a first sum value;
   increasing the reverse link gain value and re-summing the reverse link gain value and corresponding transmit power value to obtain a second sum value; and
   adjusting the reverse link gain by an amount based on the operating point and the difference in the first and second sum values.

8. The method of claim 1, wherein determining if the increase in the reverse link gain is substantially equal to the increase in the noise figure of the base station comprises:
   monitoring the transmit adjust value received by the transceiver device; and
   determining when the transmit adjust value becomes substantially constant with an in crease in the reverse link gain.

9. The method of claim 8, wherein adjusting the reverse link gain comprises:
   adjusting the reverse link gain by an amount based on the operating point and a difference in two reverse link gain values.

10. The method of claim 8, wherein adjusting die reverse link gain comprises:
    summing a reverse link gain value and corresponding transmit power value of the receiver device to obtain a first sum value;
    increasing the reverse link gain value and re-summing the reverse link gain value and corresponding transmit power value to obtain a second sum value; and
    adjusting the reverse link gain by an amount based on the operating point and the difference in the Prof and second sum values.

11. The method of claim 1, wherein establishing the reverse communication link comprises:
    initiating the reverse communication link from one of either the transceiver device or the base station.

12. The method of claim 1, wherein establishing the reverse communication link comprises:
    using a remote station circuitry within the coverage area to establish the reverse communication link.

13. The method of claim 1, wherein establishing the reverse communication link comprises:
    embedding the transceiver device in the repeater.

14. The method of claim 1, wherein determining the operating point comprises:
   determining an operating point based upon either one of link balancing or the amount of change in the noise floor of the base station.

15. The method of claim 1, wherein determining the operating point comprises:
   obtaining a nominal noise value of the repeater;
   obtaining a nominal noise value of the base station;
   determining the ratio of a maximum output power of the base station and a maximum output power of the repeater; and
   determining the operating point using the nominal noise value of the repeater, the nominal noise value of the base station and the ratio.

16. Apparatus for setting total reverse link gain between a repeater and a base station, comprising:
   means for determining an operating point for the repeater;
   means within a coverage area of the repeater for establishing a reverse communication link to the base station;
   means for determining if an increase in a reverse link gain is substantially equal to an increase in a noise figure of the base station, based on a transmit power of the means for establishing the reverse communication link; and
   means for adjusting the reverse link gain by an amount based on the operating point and based on a difference in reverse link gain values, if the increase in the reverse link gain is substantially equal to the increase in the noise figure of the base station, to set the total reverse link gain.

17. The apparatus of claim 16, wherein the means for determining if the increase in the reverse link gain is substantially equal to the increase in the noise figure of the base station comprises:
   means for summing a reverse link gain value and corresponding transmit power value of the receiver device to obtain a first sum value; and
   means for increasing the reverse link gain value and re-summing the reverse link gain value and corresponding transmit power value to obtain a second sum value until a difference in the first and second sum values is obtained.

18. The apparatus of claim 17, wherein the means for adjusting the reverse link gain adjusts the reverse link gain by an amount based on the operating point and the difference in the first and second sum values.

19. The apparatus of claim 17, wherein the means for adjusting the reverse link gain adjusts the reverse link gain by an amount based on the operating point and a difference in two reverse link gain values.

20. The apparatus of claim 16, wherein the means for determining if the increase in the reverse link gain is substantially equal to the increase in the noise figure of the base station comprises:
   means for monitoring the transmit power of the transceiver device; and
   means for determining when the transmit power becomes substantially constant with an increase in the reverse link gain.

21. The apparatus of claim 20, wherein the means for adjusting the reverse link gain adjusts the reverse link gain by an mount based on the operating point and a difference in two reverse link gain values.

22. The apparatus of claim 20, wherein the means for adjusting the reverse link gain comprises:
   means for summing a reverse link gain value and corresponding transmit power value of the receiver device to obtain a first sum value;
   means for increasing the reverse link gain value and re-summing the reverse link rain value and corresponding transmit power value to obtain a second sum value; and
   means for adjusting the reverse link gain by an amount based on the operating point and the difference in the first and second sum values.

23. The apparatus of claim 16, wherein the means for determining if the increase in the reverse link gain is substantially equal to the increase in the noise figure of the base station comprises:
   means for monitoring the transmit adjust value of the transceiver device; and
   means for determining when the transmit adjust value becomes substantially constant with an increase in the reverse link gain.

24. The apparatus of claim 23, wherein the means for adjusting the reverse link gain adjusts the reverse link gain by an amount based on the operating point and a difference in two reverse link gain values.

25. The apparatus of claim 23, wherein the means for adjusting the reverse link gain comprises:
   means for summing a reverse link gain value and corresponding transmit power value of the receiver device to obtain a first sum value;
   means for increasing the reverse link gain value and re-summing the reverse link gain value and corresponding transmit power value to obtain a second sum value; and
   means for adjusting the reverse link gain by an amount based on the operating point and the difference in the first and second sum values.

26. The apparatus of claim 16, wherein the means for establishing the reverse communication link is one of either a remote station circuitry or a transceiver device embedded in the repeater.

27. A method for setting total reverse link gain between a repeater and a base station, comprising:
   determining an operating point for the repeater;
   establishing a reverse communication link between a transceiver device within a repeater coverage area to the base station;
   repeatedly summing reverse link gain values and corresponding transmit power values of the transceiver device to obtain sum values; and
   adjusting the reverse link gain by an amount based on the sum values and the operating point to set the total reverse link gain.

28. The method of claim 27, wherein the repeatedly summing comprises:
   summing a reverse link gain value and corresponding transmit power value of the receiver device to obtain a first sum value; and
   increasing the reverse link gain value and re-summing the reverse link gain value and corresponding transmit power value to obtain a second sum value until a difference in the first and second sum values is obtained; and
   wherein adjusting the reverse link gain comprises adjusting the reverse link gain by an amount based on the difference and the operating point.

29. Apparatus for setting total reverse link gain between a repeater and a base station, comprising:
   a processor configured to determine an operating point for the repeater;
   a transceiver circuitry within a coverage area of the repeater coupled to the processor and configured to establish a reverse communication link to the base station; and a summing unit coupled to the processor and configured to repeatedly sum reverse link gain values and corresponding transmit power values of the transceiver device to obtain sum values;

wherein the processor adjusts the reverse link gain by mount bused on the sum values and operating point to set the total reverse gain.

* * * * *